United States Patent [19]
Overton et al.

[11] Patent Number: 5,756,051
[45] Date of Patent: May 26, 1998

[54] APPARATUS AND METHOD FOR AN ANODIC OXIDATION BIOCIDAL TREATMENT

[76] Inventors: James Michael Overton, 1127 Nickel La., Yuba City, Calif. 95991; Steven R. Wurzburger, P.O. Box C, Goodyear Bar, Calif. 95944

[21] Appl. No.: 751,069

[22] Filed: Nov. 15, 1996

Related U.S. Application Data

[63] Continuation-in-part of Ser. No. 277,784, Jul. 20, 1994, Pat. No. 5,575,974, which is a continuation-in-part of Ser. No. 61,483, May 12, 1993, abandoned.

[51] Int. Cl.$^6$ .............................................. A61L 2/08
[52] U.S. Cl. ...................... 422/108; 422/105; 422/22; 422/23; 422/186.04
[58] Field of Search ........................ 422/22, 23, 105, 422/108, 186.04, 243

[56] References Cited

U.S. PATENT DOCUMENTS

| | | | |
|---|---|---|---|
| 5,234,555 | 8/1993 | Ibbott | 422/22 |
| 5,326,530 | 7/1994 | Bridges | 422/22 |
| 5,368,748 | 11/1994 | Sanderson | 422/22 |
| 5,603,893 | 2/1997 | Gundersen et al. | 422/22 |

*Primary Examiner*—Timothy McMahon
*Attorney, Agent, or Firm*—Robert Samuel Smith

[57] ABSTRACT

An apparatus for destroying bacterial pathogens including at least one pair of electrodes secured in a housing configured to constrain flow of water through the region between the electrodes. In one construction, the electrodes are supported in a tube with sides of each member of an electrode pair conforming to the inner surface of the tube and electrode surfaces form a slotted space through which the water passes. In another constrcuction, one electrode is a tube and the other electrode is a rod supported concentrically inside the tube. The treated fluid passes axially through the space between the electrodes. A conductivity meter and flow meter applies a conductivity signal and a flow rate signal to maintain the field in a value that is not too excessive so as to prevent undesired reactions. The electrodes and space between the electrodes are also subject to a magnetic field which reduces rate of deposition of calacerous deposits on the electrode surfaces thereby extending the period of time between required cleaning of the electrodes. The electrodes can be simple slabs or screens or both. The electrodes are preferably tin, titanium, brass, iron or stainless steel.

9 Claims, 6 Drawing Sheets

APPARATUS AND METHOD FOR AN ANODIC OXIDATION BIOCIDAL TREATMENT

BACKGROUND

This application is a continuation-in-part to application Ser. No. 08/277,784 to issue and was filed Jul. 20, 1994, now U.S. Pat. No. 5,575,974 and which is a continuation-in-part of application Ser. No. 08/061,483 filed May 12, 1993 now abandoned for which priority is claimed.

FIELD OF THE INVENTION

This invention relates to sterilizing techniques and particularly to a method for killing bacteria in water and aqueous solutions such as fruit juices where undesirable reactions are to be minimized.

PRIOR ART AND INFORMATION DISCLOSURE

The nation's water supplies have become chemically and biologically polluted. Ever increasing instances of unsafe and biologically contaminated water are causing public health problems and have brought into sharp focus the ever increasing need for clean safe pathogen free water for human and animal consumption. This need for clean water has led to a number of devices and apparatus for purifying, disinfecting and sterilizing.

Virtually all metropolitan areas in the United States are forced to use some sort of cleaning process to eliminate the suspended solids, pathogens, unpleasant odors and undesirable tastes. Water that is naturally purified and sterilized by the action of aeration, percolation and solar illumination are highly desirable, however, natural filtration through soils and sand is becoming less and less viable as increases in population cause tremendous and significant increases in water usage. More and more we are finding that even rural areas are being forced to deal with dangerously high levels of unwanted contaminants. As a matter of practice, virtually all surface water intended for animal or human contact or consumption must be disinfected, filtered, coagulated or otherwise pretreated for the removal of unwanted and harmful micro organisms (pathogens) such as Psuedomonis Aeruginosa, Giardia, the coliform group and fecal treptococci.

For reasons of economy and technical simplicity, chlorination is a very common form of pathogenicide. In many cases the amount of chlorine required to achieve the disinfection is so excessive that the resulting odor and taste created by the chlorine itself is objectionable to the consumer. Pathogens are developing immunity to extremely high levels of chlorination and are unaffected by it.

U.S. Pat. No. 3,936,364 to Middle discloses electrolytic introduction of silver ions into water for biocidal puposes. While the addition of silver ions in sufficient concentration required to disinfect water does not adversely affect taste, color or odor of water, the residence times to achieve adequate disinfection may be quite long and therefore not practical. The public health services view a concentration on excess of 0.050 mg/l as grounds for rejection of treatment systems utilizing silver.

A number of apparatus have been been disclosed for treating water for removal of metal ions.

U.S. Pat. No. 4,054,503 to Higgins discloses a portable unit including a cathode and anode for removing precious metal from solutions with an arrangement to prevent unauthorized removal of the deposited metal U.S. Pat. No. 4,089,768 to Fischer et al discloses a battery operated purification system which operates to purify water only when the voltage applied between electrodes exceeds a battery supply voltage.

Over sufficiently long periods, the anodic units currently embodied in the prior art manifest a major problem, i.e., the electrodes become calcified (calcareous deposits thereon) and biofouled. This biofouling and calcification renders the units ineffective and allow harmful pathogens to go untreated through the unit. In such units, removal of the calcification and biofouling requires disassembly, cleaning and or replacement of the electrodes on a frequent periodic basis.

U.S. Pat. No. 4,131,526, to Moeglich discloses a container of a packed articulate material, the particulates having a coating of an oxide of metals selected from Groups IVa, Va, VIb and VIb with a pair of elongated electrodes extending through the bed. An ac voltage is applied between the electrodes to effectively oxidize and remove contaminants such as phenols which are otherwise difficult to remove.

U.S. Pat. No. 4,525,253 to Hayes et al discloses a cell having two electrodes for discharging copper and silver ions into the water at an adjustable rate to destroy bacteria.

U.S. Pat. No. 4,915,846 to Thomas et al discloses a water clarification apparatus for removing dye and other organic matter comprising a pair of electrodes spaced from one another. Passage of current between the electrodes causes the dye to coagulate after which the coagulated matter can be removed by conventional sewage treatment methods.

A number of problems are inherent in these devices of the prior art which are overcome by the present invention.

One problem is that the electrical environment experienced by any portion of the fluid depends on the passing through the apparatus depends upon the path through the device. A second problem is the problem of imposing a sufficiently large electric field for a long enough period of time to be effective for killing bacteria or oxidizing contaminants.

An apparatus which is claimed in an application of which the present invention is a continuation-in-part and which is scheduled to issue Nov. 16, 1996, discloses a pair of parallel screen electrodes through which the water passes normal to the plane of the screens. A large field gradient can be generated by positioning the screens close to one another. This construction is useful for many important situations however, since the "kill rate" imposed by the bacteria is determined by the time of exposure as well as the magnitude of the field, the screen structure is normally adaptable only to situations where the flow rate is slow.

Another complicating factor prevails in situations where it is desirable to kill bacteria that are present in juices such as fruit juices without degrading (oxidizing) the nutritive components of the juice. This factor is associated with the phenomenon referred to herein as "relaxation time" which is the time required for a reaction, such as killing a bacterium or oxidizing an ion to occur. Ideally, a portion of solution containing bacteria and oxidizable ion is subjected to a field for a period of time less than the relaxation time to decompose or oxidize a molecular component of the juice but long enough to kill the bacteria.

THE INVENTION

Objects

It is an object of this invention to provide an apparatus and method for treating water so as to render the water pathogen free for animal or human contact and consumption. It is another object that the treatment be effective for water from a wide variety of sources.

It is another object that the apparatus be operative for long periods of time compared to devices of the prior art.

It is another object to be able to be able to precisely control the three important parameters associated with the method of killing bacteria without degrading other organic molecules such as may be present in the the fluid (.e.g. juices)

It is another object that the apparatus for suitable for use with situations where variations in conductivity must be permitted.

It is another object that the apparatus for suitable for use with situations where intermittent varying rates of flow must be permitted.

It is another object that the method and apparatus of this invention be adaptable to situations where it is required to suppress certain undesired reactions while witll operating as an effective microbicidal system. Such reactions include oxidizing reactions in such media as juices where oxidation of citric acid must be avoided.

SUMMARY

This invention is directed toward an apparatus including sets of electrodes which impose an electric field in a stream of water to kill bacteria. More than one set of electrodes are arranged such as to provide the most effective flow pattern. The electrodes are disposed in a magnetic field having a unique pattern and sufficient intensity to prevent formation of calcareous deposits on the electrodes. The electrodes are preferably made from a group of metals including iron, titanium, tin, brass and stainless steel.

An important feature of the invention is the structure of the electrodes positioned in the conduit in which at least one of the electrodes is a screen and positioning seals are provided such that all of the water passing through the conduit passes through the screen. The advantage of this arrangement is that, for a given applied voltage between electrodes, the distance between electrodes can be reduced to provide a very large field while the imposition of the screen in the current of water does not impede the flow of current such as occurs with solid electrodes.

In another embodiment, the microbicidal cell includes a sleeve electrode and a rod electrode positioned inside the sleeve electrode. All of the solution is confined to flow between the electrodes. Then magnitude of the field is controlled by either a flow meter or a conductivity meter or both so as to prevent undesired reactions such as the too much electrolysis of water or oxidation of anions.

DESCRIPTION OF THE BEST MODE

Figure 1:
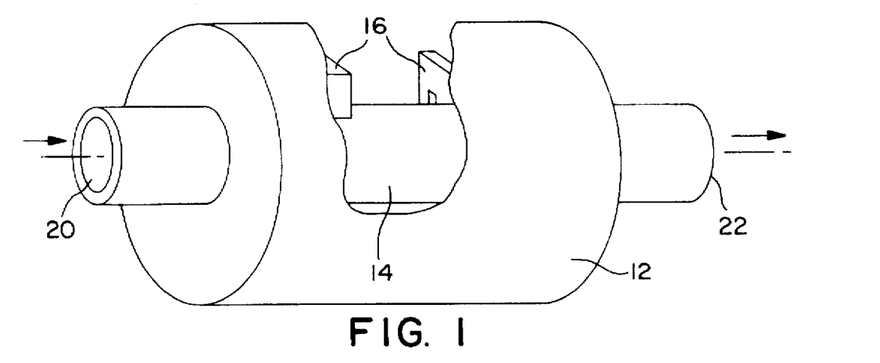
FIG. 1 is a perspective view of a biocidal treatment apparatus in accordance with the invention.

Turning now to a discussion of the drawings, FIG. 1 is a perspective assembly view of the anodic oxidation apparatus for biocidal treatment showing the outer housing 12 partially cut away to reveal the inner flow tube 14 and two magnet assemblies 16, straddling the electrode housing 14. Flow tube 14 is a polymer tube such as polyethylene, polypropylene, ABS, etc. Water to be treated flows into inlet 20 and treated water flows out of outlet 22.

Figures 2, 3B:
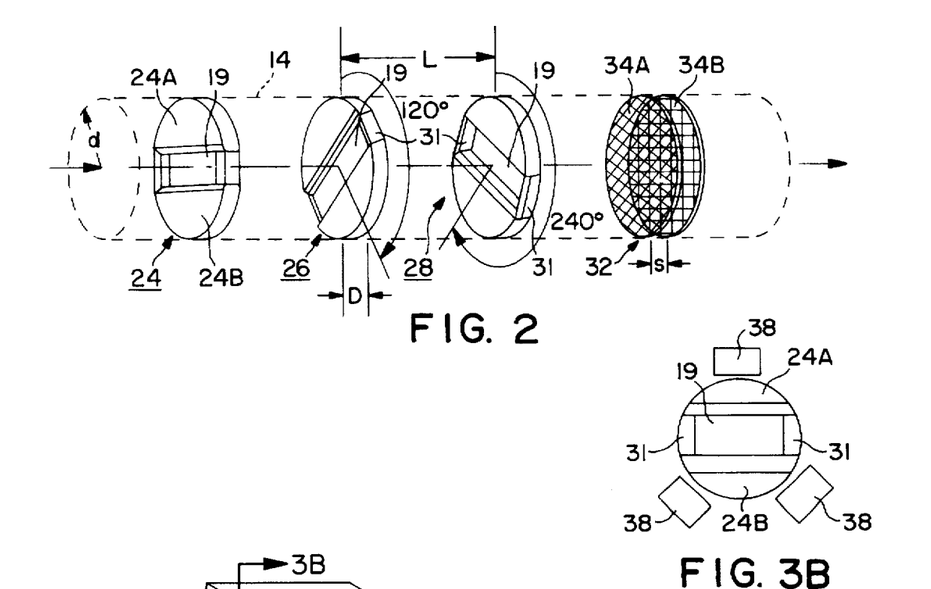
FIG. 2 is a perspective view of the electrode assembly.
FIG. 3A and 3B illustrates the arrangement of magnets around the electrodes.

FIG. 2 shows the four sets of electrodes inside flowtube 14. Flowtube 14 is shown in phantom in FIG. 2. Sets 24, 26 and 28 are identical except that each is oriented 120 degrees with respect to the other two as indicated in FIG. 2.

Figures 4A, 4B, 4C:
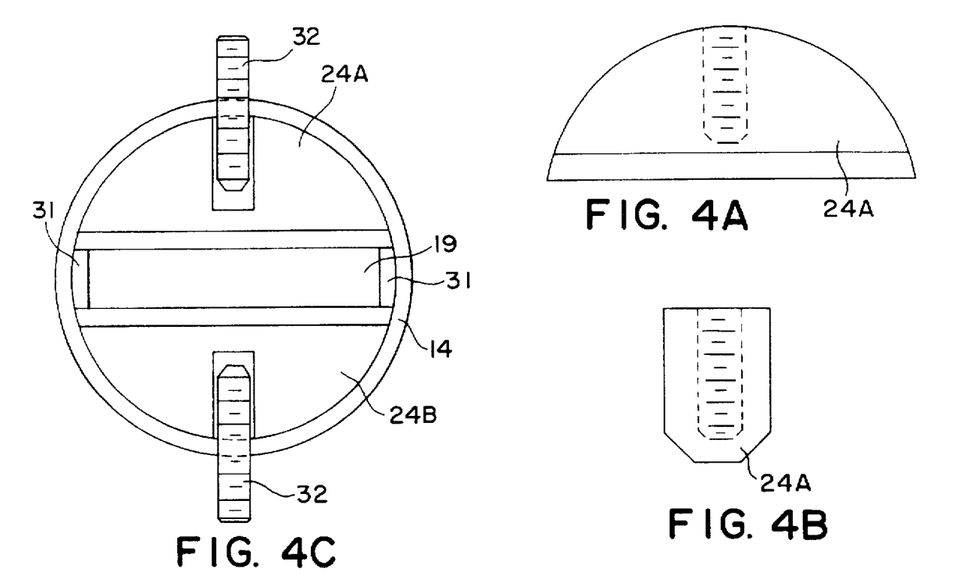
FIG. 4A, 4B and 4C show details of the plate electrodes.

FIG. 4 shows details of an electrode such as make up the sets 24, 26 and 28. FIG. 4A is a plan view and FIG. 4B is an end view of one of the electrodes 24A. FIG. 4C shows two electrodes 24A and B secured opposite one another and secured to electrode housing 14 by stainless steel studs 32. Studs 32 also serve as terminals for applying an electric field between each pair of electrodes.

FIG. 2, 3B and 4C show diverters 31 placed between neighboring ends of the electrodes 24, 26, 28 which deflect the flow of water between the electrodes away from the interior wall of the electrode housing thereby ensuring that no water passing between the electrodes escapes the full intensity of the field between the more central section of the electrode assembly.

Figures 5A, 5B, 5C:
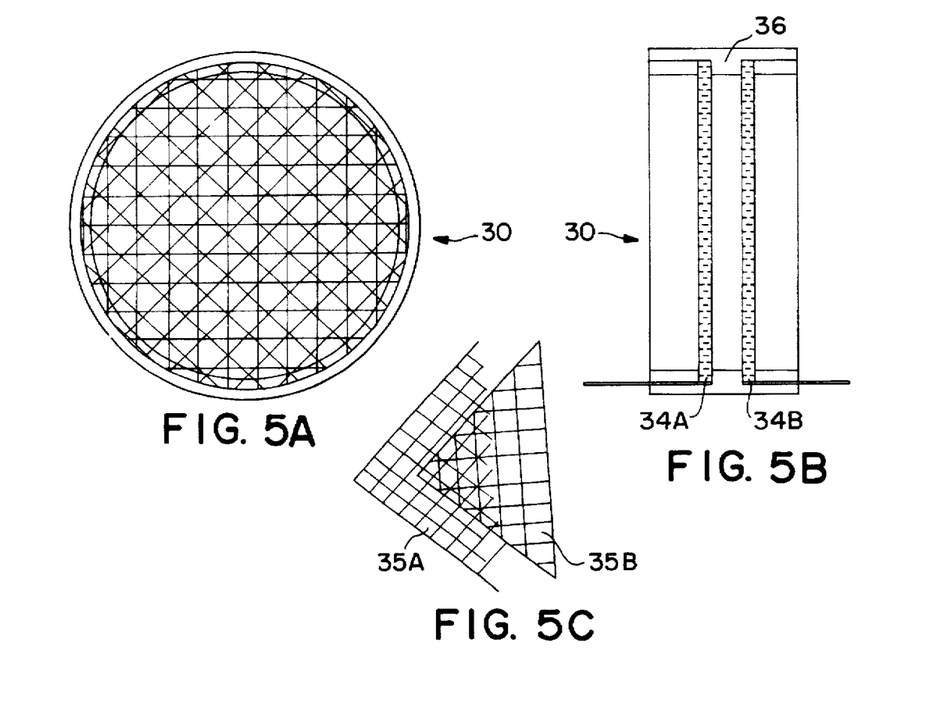
FIG. 5A and 5B shows details of the screen electrodes.
FIG. 5C shows screen electrodes having a conical form.

FIG. 5A is a plan view and FIG. 5B is a side view of electrode set 30 (FIG. 2). FIG. 1B shows each electrode 34A and 34B to be two circular screens parallel to and spaced from one another by abutting against shoulders in a collar 36 that fits in the flow tube 14.

FIG. 5C shows screen electrodes 35A and B having a conical shape which are most effective for pipe diameters greater than four inches.

Figure 3A:
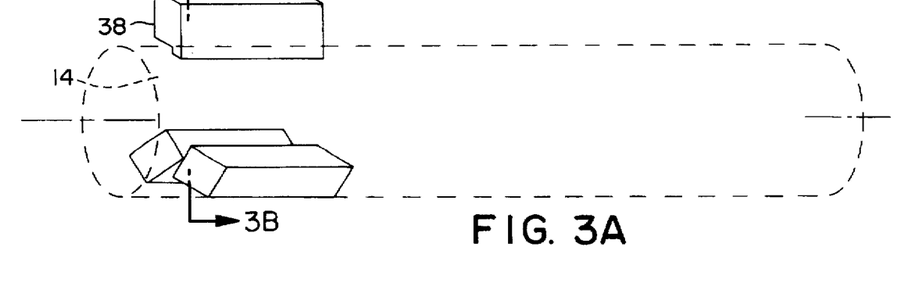

FIG. 3A shows three magnets 38 arranged around the flow tube 14. FIG. 3B is a sectional view taken along line of sight 3B in FIG. 3A showing the arrangement of the three magnets 38 of each set in relation to the adjacent electrodes 24A and B.

Figure 9:
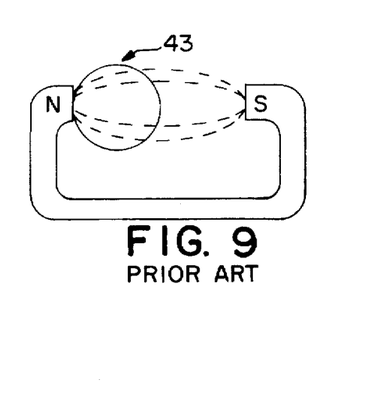
FIG. 9 is a prior art drawing illustrating a converging magnetic field.

Preferably, the magnetic field is a north homopolar field. For the purposes of this specification a north homopolar field is understood to mean a magnetic field in a region in which the magnetic field converges toward the north pole such that the magnetic flux lines are "compressed" as one moves in the direction toward the north pole. A north homopolar field is illustrated in FIG. 9. which shows a magnet having a north pole and a south pole with flux lines (represented by the dashed lines) diverging from both the north pole and the south pole. According to the terminology of this specification, a north homopolar field lies within circle 43.

Referring to FIG. 2, the orientation at 120 of the slot of one electrode set (24, 26, 28) with respect to the slot 19 of its neighboring electrode set as well as orientation at 45 of screen electrode 34A with respect to electrode screen 34B are important design features of the invention in introducing turbulence into the flow pattern as the water flows through the fields thereby ensuring thorough treatment of the water.

Figure 6:
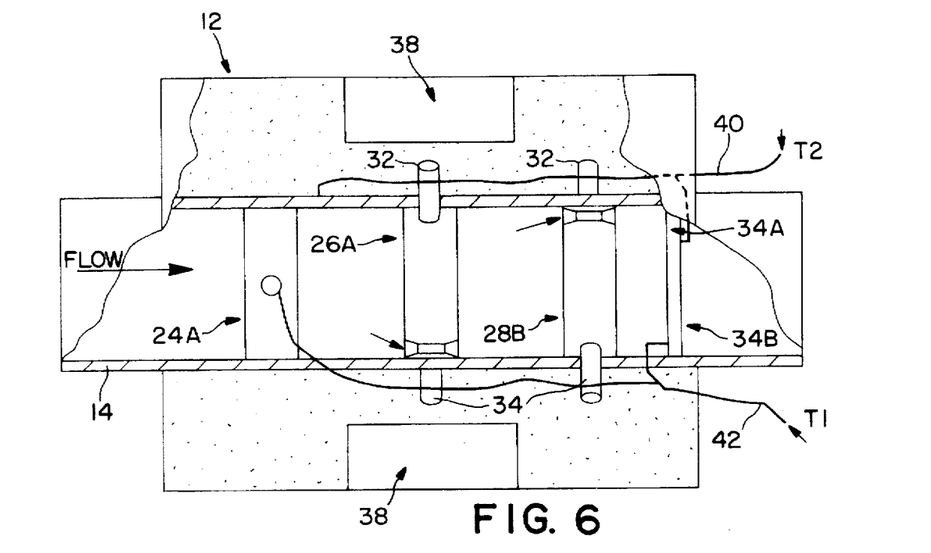
FIG. 6 shows the wiring of the electrodes.

FIG. 6 is a plan cutaway view showing the electrical connections to the electrodes by positive lead 40 and negative lead 42 connected to a D. C. power supply (not shown in FIG. 6). at terminals T1 and T2.

Figure 7:
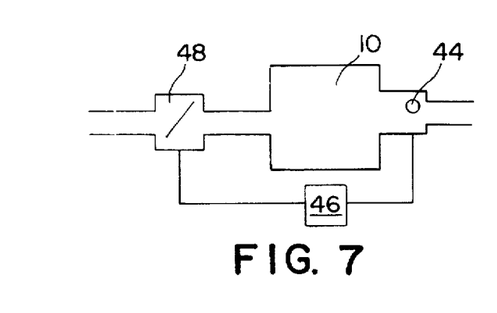
FIG. 7 shows the apparatus of FIG. 1 provided with an automatic flow shutoff.

FIG. 7 is an electrical schematic diagram showing the presence of a flow sensor 44 downstream from the treatment apparatus 10 and is connected to control circuit 46 such that when flow through the treatment apparatus drops below a critical value, the power shuts off. This feature enables use of the device in situations where the flow of water is intermittently interrupted so that, when the water is not flowing (such as in domestic use) power is conserved. The aparatus is also provided with an automatic shutoff valve 48 which stops flow of water through the system in the event of a power failure.

Figure 8A:
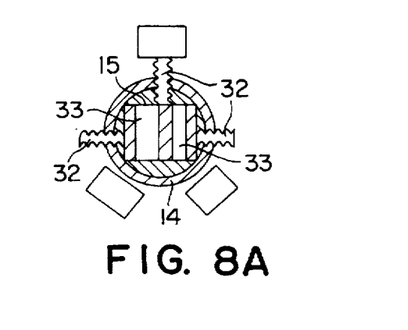
FIGS. 8A and 8B show another arrangement of electrodes for treating water in accordance with the invention.
Figure 8B:
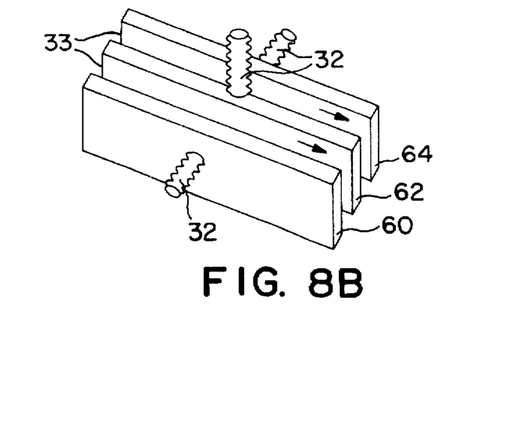

FIGS. 8A is a sectional view of another construction in accordance with the invention. showing three electrodes, 60, 62 and 64, each of which is a rectangular slab arranged parallel to one another as shown in the perspective view FIG. 8B. Electrical connection to each electrode is made by studs 32. The array of electrodes 60, 62, 64 is encased in epoxy and positioned on flow tube 14. Magnets 38 (five are shown) are arranged around the flow tube 14.)

Water flows through spaces between the electrodes. The central electrode 62 is maintained at a positive electrical potential with respect to the outer electrodes 60 and 64 generating an electric field in the spaces 33 so that the water flowing through the spaces 33 is subject to an electric field and a magnetic field.

The apparatus was run for a period of fifty hours with the magnet assemblies in position and fifty hours with the magnets removed from the apparatus. A substantial amount of calcareous deposit collected in the case where there were no magnets whereas an insignificant deposit accumulated when the magnets were positioned in the apparatus.

EXAMPLE

Olivehurst Public Utilities District experienced a problem with the contamination of a subdivision by Pseudomonis Aerugnosa. Samples were taken to verify the magnitude of contamination. The initial samples exhibited a count of 1600 colonies per 100 ml and a standard plate count of 12,000 for all bacterial species. The water sample were treated using the biocidal apparatus illustrated in FIG. 2 in which the diameter "d" of the flow tube was 2.6 inches, the thickness "D" of each electrode (60, 62, 64) was ⅞ inches, the distance between electrodes "L" was 2 inches, and the the distance between the the two electrode screens "s" was 0.25 inches. At a flow rate of 2.5 gal. per min., the following results were obtained.:

| Voltage (D. C.) | Starting # colonies: 1600 per ml. # of colonies per 100 ml | Starting total plate count 12,000 total plate count |
| --- | --- | --- |
| 0 | 1600 | 12,000 |
| 45 | 13 | 68 |
| 75 | 2 | 71 |
| 100 | 50 | 83 |

In another test, a total of substantially 200,000 Giardia lamblia cysts were spiked into twenty gal. of tap water and treated using the apparatus shown in FIG. 6 operated at 75 volts. Test results shows that 289 cysts were found intact by the state certified laboratory, BioVir.

An average of 20% recovery is usually seen in the process of collecting cysts in the test, i.e., about 20% of the actual population of cysts are seen under the microscope. Therefore, it is estimated that approximately 1,445 cysts should be present after the treatment. It may then be concluded that 0.72% of the initial Giardia was not killed. According to the law, water dispensed to the public must have 99.9% of Giardia lamblia destroyed in the water. The tests of this invention recited above indicate that 99.3% were destroyed.

Figure 10:
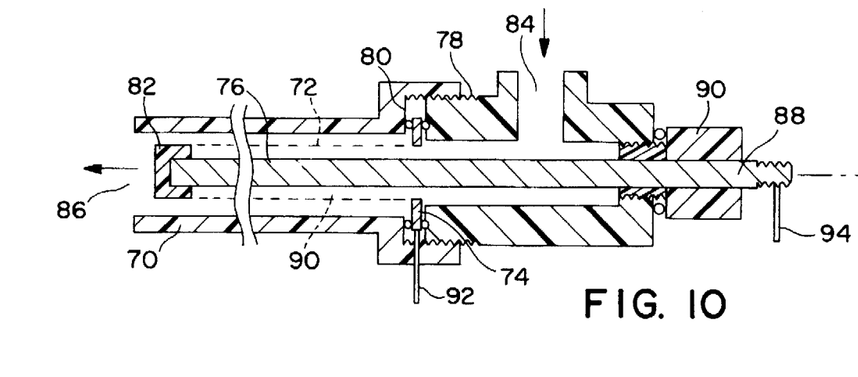
FIG. 10 is an exploded perspective view of a device with cylindrical electrode.
Figures 11, 13:
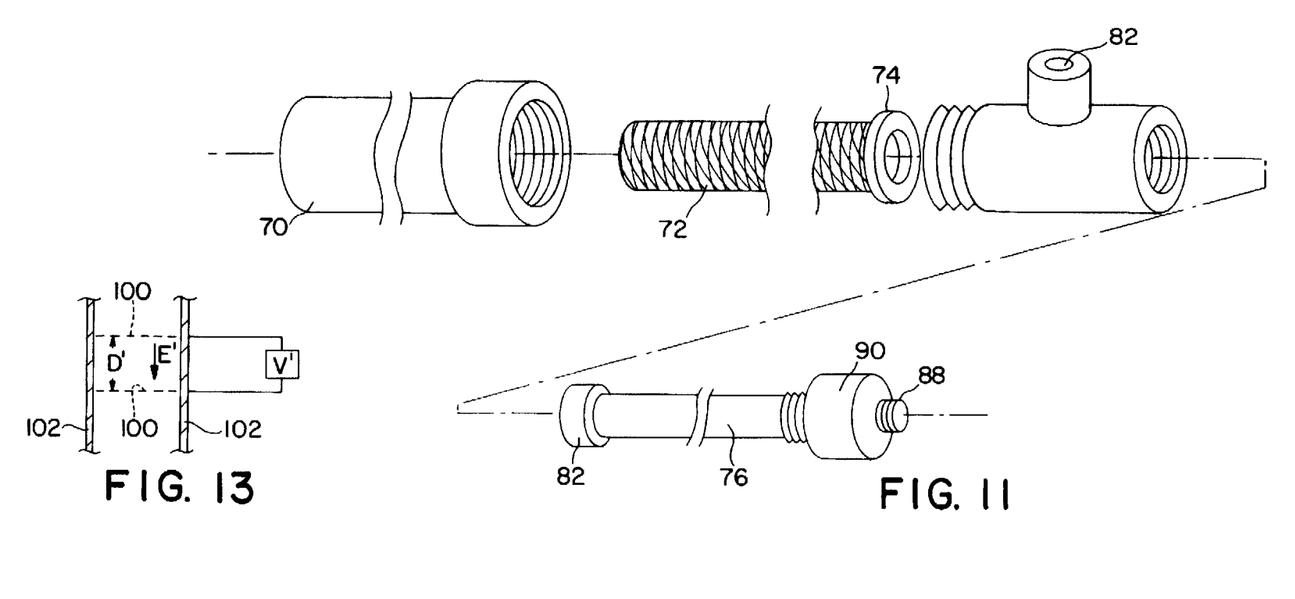
FIG. 11 is a sectional assembly view of the device of FIG. 10.
FIG. 13 illustrates the advantages of the screen electrodes.

Another embodiment of the invention featuring a screen electrode is illustrated in the sectional view, FIG. 10 and the exploded perspective view, FIG. 11. A cylindrical screen electrode 72 is positioned inside an outer conduit 70 by a flange 74 on electrode 72 clamped between a shoulder 80 inside conduit 70 and a compression fitting 78 screwed onto conduit 70. A cylindrical electrode 76 is positioned inside screen electrode 72. A spacer seal 82 closes the opening at the end between the screen electrode 72 and the inner electrode 76. Another end 88 of electrode 76 is mounted in fitting 90 which screws into compression fitting 78 so that all of the fluid passing into or out of port 84 and out of or into port 86, respectively, passes through the screen electrode 72 and therefore through the region 86 between electrodes. An electrical potential applied between terminals 92 to the screen electrode and 94 to the inner electrode generates an electrical field in the region 90 so that all of the water passing in either direction through the conduit is subject to the electrical field.

An important advantage in using screen electrodes such as shown in FIGS. 5A, 5B, 10, and 11 compared to the solid electrodes shown in FIG. 4A, B, C is that, with solid electrodes (4A,B,C), when the electrode spacing is made small in order to increase the field strength (for a given applied voltage), the region of current flow is restricted such as to reduce the flow of water. In comparison, a screen electrode can be positioned as close to the other electrode as required to attain a large field strength without sacrificing rate of current flow between the electrodes. The construction of the electrodes shown in FIGS. 5A, B, C and FIGS. 10 and 11 provides that all of the water passes through the screen into the region between the electrodes. All of the water experiences a uniform change in electrical potential between electrodes. The field from a moderate potential can be large by simply reducing the distance between the electrodes.

Figure 12:
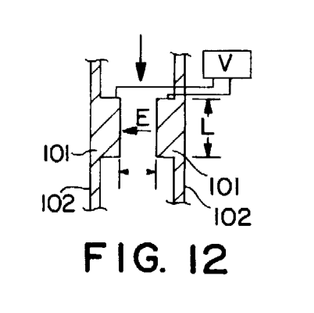
FIG. 12 illustrates the field generated and restriction of flow encountered with solid electrodes.

The advantages of the screen electrode are further illustrated by comparing the structure with screens 100 shown in FIG. 13 with the structure with solid electrodes 101 shown in FIG. 12. The outer walls 102 of the conduit are shown and it may be assumed that the impedance to flow from the conduit is negligible because of the relatively large cross sectional area of the conduit. However, the presence of the solid electrodes 101 as shown in FIG. 12 introduces an impedance to flow that is proportional to L/D. The field imposed between the electrodes is V/D Therefore, in the case of FIG. 12, the value of D must be a compromise between the value of field, E, that is required and tolerable restriction of current flow. The us e of screen electrodes shown in FIG. 13 introduces no appreciable resistance to water flow. Therefore the value of D' may be selected to be as small as desired consistent with the limitations of the power supply, V', in order to obtain a large field E' without impeding flow of water.

Figure 14:
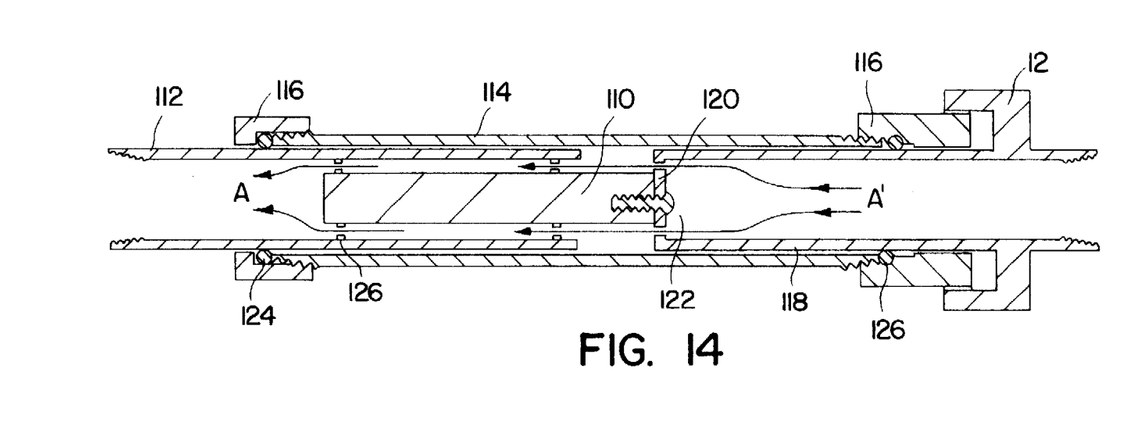
FIG. 14 shows an embodiment of the invention with a sleeve electrode and rod electrode.

The Giardia lambia cysts are generally very difficult to kill. However, as shown by the results reported above, passage of water containing the cysts through screen electrodes into a region having a field of greater than 70 volts per cm killed greater than 99.9% of the Giarda Lambia. This observation suggests that a field strength greater than 20 volts per cm is effective in reducing the density of the Giarda Lambia population to a safe level. FIG. 14 is a sectional view of yet another embodiment 101 of the microbicidal cell of this invention showing a "rod" electrode 110 slidably positionable inside a "sleeve" electrode 112. Both electrodes are supported in alignment inside an insulating housing tube 4 (preferably polyvinyl chloride or the equivalent) with spacers 124. A support tube 118 abuts rod electrode 110 and is screwed to rod electrode 110 by a support plate 120 with screw 122. Caps 116 screwed onto each end of housing tube 114 compress elastomeric seals 126 against housing tube 114 and sleeve electrode 112 and rod electrode 110 respectively thereby preventing leakage of fluid and maintaining the position of the housing tube relative to the electrodes 112 and 118.

Electrical connectors 132 and 134 connect rod electrode 110 and sleeve electrode 112 to power supply 130 for generating a microcobe killing electric field through the fluid in the space 136 between the electrodes, 112 and 110.

In the operation of the embodiment of FIG. 14, fluid to be treated by an electric field is represented by the flow lines AA' and flows into support tube 118, through openings 123 in support plate 120, then through the space between rod electrode 110 and sleeve electrode 112.

The effectiveness for killing the microbes also depends on the length of time (dwell time) that the microbe containing fluid is in the field region. The shorter the dwell time, the greater must be the applied field. The time may vary due to an unavoidable variation in the flow rate.

Another controlling factor is the limit of maximum electrical current that is permitted to pass through the solution. The maximum limit of current is, in a typical case, where excessive bubbling occurs indicating decomposition of the water. The maximum limit of current (where excessive bubbling occurs ) decreases as the conductivity of the solution increases.

For a given conductivity of the solution, the maximum electrode current below which excessive bubbling (or other undesired reactions such as the decomposition of constituents of juices) does not occur depends on the dwell time of the fluid between the electrodes, i.e., the flow rate of the fluid.

In view of the variable conditions of conductivity and flow rate, the power supply is a constant current source wherein the value of constant current is selected by a combination of readings from a flow meter 148 in the fluid stream which sends a flow rate value to power supply 146 and a conductivity meter 147 which sends conductivity readings to to the power supply 146.

Figure 17:
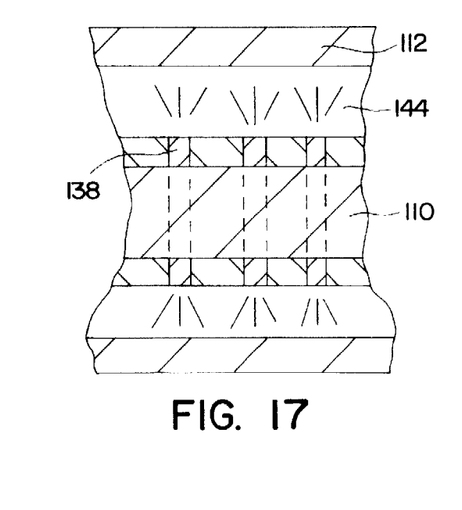
FIG. 17 shows the field intensifying effect of the ring electrodes.

FIG. 17 shows a schematic diagram of the power supply controlled by flow rate and conductivity readings for applying the required controlled voltage between the electrodes in the microbicidal cell 101 of FIG. 14. The microbicidal cell 101 forms one branch of a bridge having other branches 150 and 152 and a fourth branch 154 which is a variable impedance circuit. A null detector 156 controls the variable impedance circuit 154 and is responsive to changes in impedance of cell 101. Changes in impedance of cell 101 are due to fluctuations in the conductivity of the fluid flowing in cell 101.

The source of power connected at locations 158 and 159 is provided by a circuit that includes a power source 160 connected in series with a variable impedance circuit 162 which is controlled by a signals from a flow meter 164 in cooperation with flow detector 166. The first variable impedance 162 circuit is connected to a second variable impedance circuit 164 which is connected to the bridge at location 158. The second variable impedance circuit 168 is responsive to the null detector 156. In summary, the applied electric field across the electrodes is responsive to both the rate of flow as detected by flowmeter 164 and changes of conductivity detected by null detector 156.

Figure 15:
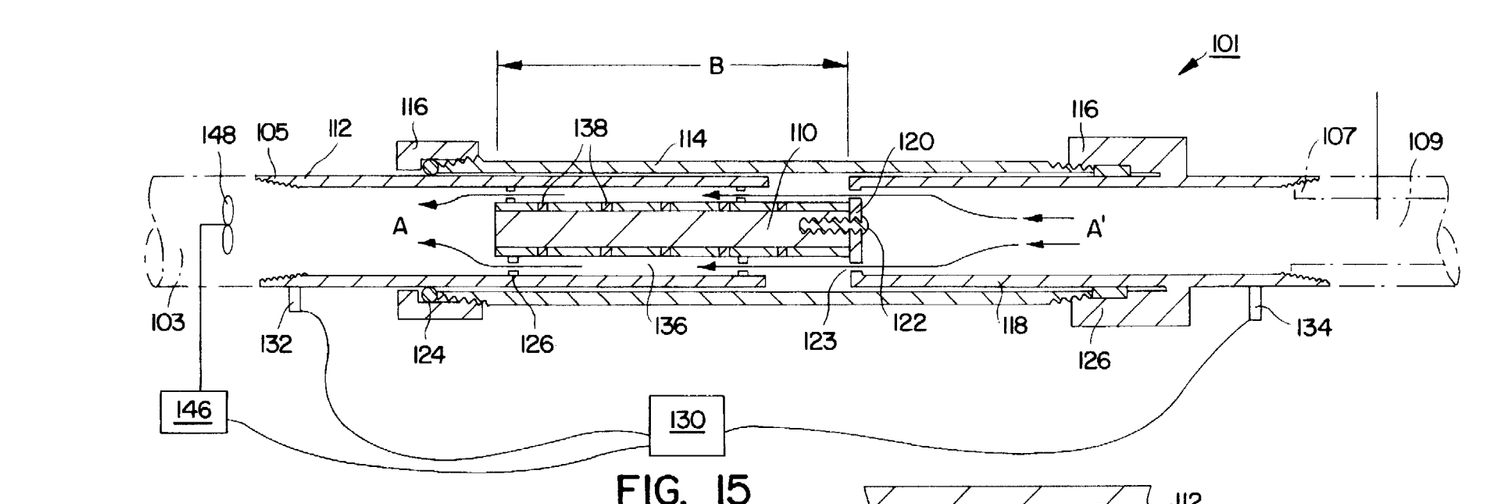
FIG. 15 show the embodiment of FIG. 14 with ring electrodes.
Figure 16:
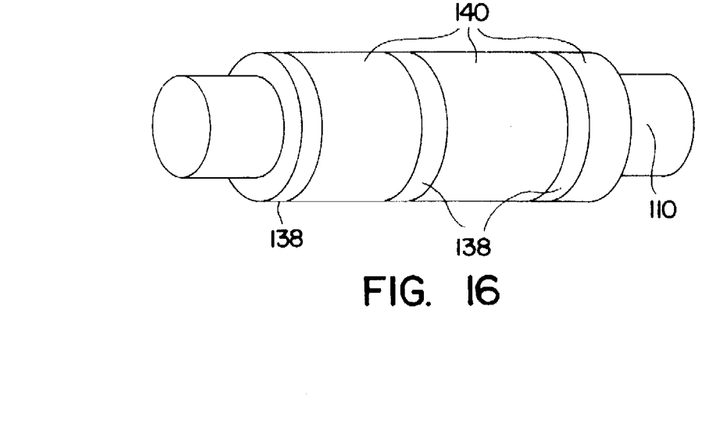
FIG. 16 shows the ring electrodes of FIG. 15.

An inherent advantage of the design of FIGS. 14–16 is that the apparatus 110 is connectable into an existing fluid line 103 by pipe thread 105 on the sleeve electrode 112 joined to one section 103 of conduit and a pipe thread 107 on an end of support tube 118 joined to another section 109 of conduit.

FIG. 15 shows a variation of the embodiment of FIG. 14 in which ring electrodes 138 are slid onto the rod electrode 110. Ring electrodes 138 are separated from one another by insulating spacers 140 as shown to best advantage in the cutaway view of FIG. 16. The advantage of the ring electrode structure is illustrated in the sectional view of FIG. 17, which shows electric field lines 144 representing that regions of very intense electric fields are generated due to the ring structure. In FIG. 15, the fluid passing between the electrodes is subject to a series of a very intense field for a very short period of time. If the period of exposure time were continuous rather than interrupted, other reactions can take place in addition to killing microbes such as degradation of molecular constituents of vitamins in juices etc. even though the total time of exposure is the same in the continuous case (without rings) and the interrupted case (with rings). The structure of FIG. 15 overcomes this problem.

An inherent advantage of the structures of FIGS. 14 and 15 is that the spacing between the electrodes is generally sufficiently small compared to the diameter of the rod electrode small such that every portion of fluid passing between the electrodes experiences an identical electric field and exposure time.

The conditions for killing microbes depends on the strength of the electric field and the time that the field is imposed on the subject region of the fluid current. For a given rate of flow, the time for applying the field may be adjusted by loosening the collars 116 and adjusting distance "B" by slidably positioning the inner electrode inside the sleeve electrode. 112 then tightening the collars 116.

Figure 19:
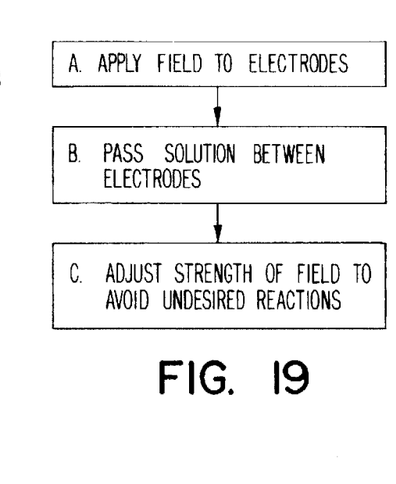
FIG. 19 shows the steps for practicing the invention.

FIG. 19 shows the steps in the method for practicing the invention.

The steps include
(a) applying an electric field between a pair of electrodes, each electrode having a face facing the other electrode and having a space between the electrodes wherein the space has a length parallel to said faces;

(b) passing the solution through the space along the length whereby the solution is exposed to the field;

(c) adjusting strength of the field to a value below which substantial undesirable electrolytic reaction in the solution is avoided and where said microbes are destroyed. In the case where the solution is an organic aqueous liquid such as fruit juices, the field is adjusted to a threshhold value below which certain oxidation of anions such as citric acid will not take place.

The step of adjusting the electric field strength is performed together with any one of the steps the steps of:

(i) measuring a rate of flow of said solution and adjusting said electric field to a value which is a combination of rate of flow, applied field, said length and a conductivity of said solution.

(ii) measuring a rate of flow of said solution and applying said rate of flow to adjusting said length to a value which avoids said undesired reaction.

(iii) measuring a conductivity of said solution and applying said measurement to adjusting said electric field to a value which avoids said undesired reaction.

The following table lists experimental rates of bacteria kill on four samples, A, B, C, D reported by BioVir Laboratories, Benicia using an apparatus built in accordance with the design of FIGS. 14 in which:

the rod electrode 110 is six inches long and has a diameter of 1.5 inches;

the sleeve electrode 112 is nine inches long and has an inner diameter of 2.37 inches;

the current between electrodes was maintained at close to but less than 5 amps;

the electrode material is stainless steel.

TABLE

| sample | *starting bacteria count | *final bacteria count |
|---|---|---|
| A | 25,000 | 120 |
| B | 25,000 | 270 |
| C | 25,000 | 182 |
| D | 25,000 | 166 |

*Bacteria count expressed as number of cysts per liter

Measurement of cyst count was performed by BioVir Laboratories, Inc., an independent laboratory located in Benicia, Calif.

A wide range of conducting materials may be used for the electrode material of this invention although stainless steel, carbon or a platinum plated metal (e.g., copper) are preferred.

In the foregoing paragraphs, an apparatus has been described which meet the objects of the invention. Major features of the apparatus are:

an arrangement of electrodes defining a flow path of contaminated water between the electrodes to destroy bacteria and in which the device can be connected in line with an existing flow system;

incorporating a constant current power supply to prevent application of excessive field;

use of a flow meter and conductivity meter to maintain a current flow below a predetermined value;

an electrode structure wherein the active space between electrodes is adjustable.

The overall objective of the invention has been reached by providing a method for killing microbes while minimizing the occurrence of undesired reactions in the aqueous solution. Important undesired reactions that are encountered in practice would include dissociation of water and oxidation of anions in the juices of fruits such as citric acid.

Modifications may be suggested by reading the specification and studying the drawings which are within the scope of the invention.

Figure 18:
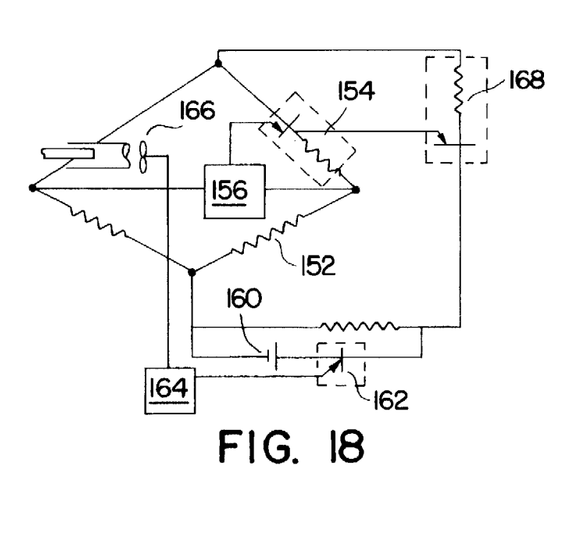
FIG. 18 shows a schematic diagram of a circuit with a conductivity meter and flow rate meter for contolling the field.

For example, while the power supply shown in FIG. 18 is constructed to deleiver a "direct current" voltage, there may be situations where an acc field may be more effective.

We therefore wish to define the scope of this invention by the appended claims and in view of the specification if need be.

What is claimed is:

1. An microbicidal cell for killing microbes that are carried by an aqueous solution flowing through a conduit (103) which comprises:

a sleeve electrode (112) being a cylindrical tube made of electrically conducting material and having a cylindrical outside surface and cylindrical inside surface;

means (105) for joining said one end of said sleeve electrode to one end of a first section of said conduit (103) providing that said fluid is permitted to flow from said conduit through said sleeve electrode;

a rod electrode (110) being a cylindrical rod positioned partially into another end of said sleeve electrode such that an extended end of said rod electrode extends from said another end of said sleeve electrode;

spacer means (126) for maintaining a concentric space between said sleeve electrode and said rod electrode and permitting adjustable axial positioning of said rod relative to said sleeve;

a support tube (118) having support plate means (120) for securing one end of said support tube to said extended end of said rod electrode;

said support plate means having openings (123) permitting fluid to flow from said inside said support tube to said space between sleeve electrode and said rod electrode; means (107) for securing another end of said support tube to a second section (109) of said conduit and for permitting fluid to flow from inside said support tube into said second section of said conduit;

a sleeve housing means (114) having means (116) for supporting said sleeve electrode and means for supporting said support tube (118) and said rod electrode all in concentric alignment with one another and for providing that said fluid is permitted to flow from said said first section of said conduit, through said sleeve electrode, through said space between said rod electrode and said sleeve electrode, then through said support tube, then through said second section of said conduit;

power means (130) for generating an electric field in said space between said sleeve electrode and said rod electrode providing that, when said fluid flows in said space and said electric field is applied in said space, microbes in said fluid are destroyed.

2. The cell of claim 1 wherein said cell comprises:

said power means including a power source providing an output voltage;

a flow measuring means for generating a flow rate signal responsive to flow rate of said fluid;

said flow measuring means connected to said power means such as to permit said output voltage to be responsive to said flow rate signal.

3. The cell of claim 1 wherein said cell comprises:

said power means including a power source providing an output voltage;

a conductivity measuring means for generating a conductivity signal responsive to conductivity of said fluid;

said conductivity means connected to said power means such as to permit said output voltage to be responsive to said conductivity signal.

4. The cell of claim 1 wherein said means (105) for joining said one end of said sleeve electrode to one end of a first section of said conduit (103) is a threaded pipe connection.

5. The cell of claim 1 wherein said means (107) for joining said another end of said support tube to one end of said second section of said conduit (109) is a threaded pipe connection.

6. The cell of claim 1 wherein said rod electrode further comprises a plurality of conducting electrode spacer rings slidably positioned on said cylindrical rod and a plurality of insulating spacer rings slidably positioned on said cylindrical rod, one said spacer ring separating neighboring electrode spacer rings.

7. The cell of claim 1 wherein said sleeve electrode is made of a conducting material that is selected from a group of materials that consists of stainless steel, carbon, a metal having an outside surface plated with platinum.

8. The cell of claim 1 wherein said sleeve electrode is made of a conducting material that is selected from a group of materials that consists of stainless steel, carbon, tin, a metal having an outside surface plated with platinum.

9. The cell of claim 1 wherein said electric field is one of an dc field and a dc field.

\* \* \* \* \*